(12) United States Patent
Zaffino

(10) Patent No.: US 6,888,823 B1
(45) Date of Patent: May 3, 2005

(54) METHOD FOR PROVIDING ALTERNATIVE NETWORK-ASSOCIATED SERVICE ADDRESS MOBILE REGISTRATION

(75) Inventor: Richard Zaffino, Kirkland, WA (US)

(73) Assignee: Cingular Wireless II, Inc., Redmond, WA (US)

( * ) Notice: Subject to any disclaimer, the term of this patent is extended or adjusted under 35 U.S.C. 154(b) by 0 days.

(21) Appl. No.: 09/330,272

(22) Filed: Jun. 11, 1999

Related U.S. Application Data

(60) Provisional application No. 60/113,928, filed on Dec. 24, 1998.

(51) Int. Cl.[7] .............................................. H04L 12/66
(52) U.S. Cl. ...................................... 370/354; 370/328
(58) Field of Search ............................... 455/433, 435; 370/335, 352, 353, 354, 355, 328, 338

(56) References Cited

U.S. PATENT DOCUMENTS

| | | | | |
|---|---|---|---|---|
| 5,590,133 A | * | 12/1996 | Billstrom et al. ............ | 370/349 |
| 5,603,084 A | * | 2/1997 | Henry, Jr. et al. ........... | 455/331 |
| 5,655,219 A | * | 8/1997 | Jusa et al. .................... | 370/338 |
| 5,793,762 A | * | 8/1998 | Penners et al. .............. | 370/389 |
| 5,901,352 A | * | 5/1999 | St-Pierre et al. ............ | 455/426 |
| 5,901,359 A | * | 5/1999 | Malmstrom ................. | 455/461 |
| 6,259,782 B1 | * | 7/2001 | Gallant ........................ | 379/211 |
| 6,304,753 B1 | * | 10/2001 | Hartmaier .................... | 455/413 |
| 6,373,933 B1 | * | 4/2002 | Sarkki et al. ................ | 379/126 |
| 6,504,839 B2 | * | 1/2003 | Valentine et al. ........... | 370/354 |

* cited by examiner

Primary Examiner—Kenneth Vanderpuye
(74) Attorney, Agent, or Firm—Kenyon & Kenyon

(57) ABSTRACT

A method provides for utilizing a packet-switched network to support services provisioned to mobile station subscribers. Address information is exchanged with a mobile switching center that services the subscriber so as to be able to identify data port addresses to be utilized to support the services via transmissions over a packet-switched network.

18 Claims, 3 Drawing Sheets

__US 6,888,823 B1__

METHOD FOR PROVIDING ALTERNATIVE NETWORK-ASSOCIATED SERVICE ADDRESS MOBILE REGISTRATION

CROSS REFERENCE TO RELATED APPLICATION

The present invention claims priority to provisional application Ser. No. 60/113,928 filed on Dec. 24, 1998 entitled "Method For Providing IP-Associated Mobile Registration", the entire disclosure of which is hereby incorporated by reference.

FIELD OF THE INVENTION

The present invention is directed to a method and apparatus for permitting a mobile device to register for services. More particularly, the present invention is directed to a method and apparatus for shifting communication service registration from a dedicated signaling network to a general purpose data network.

BACKGROUND OF THE INVENTION

Wireless services have become more and more popular. Such wireless services provide subscribers with mobility while still maintaining the ability to communicate either by voice or by data with others. As the number of wireless subscribers has increased, there has been a strain placed both on the communication networks themselves as well as the signaling networks which have been utilized for call setup, call control, and mobility management, such as the SS7 signaling network. As more sophisticated services have developed for the mobile subscriber, these services have grown to rely heavily upon available SS7 signaling network bandwidth. The combination of this increase of services and an increase in subscriber base threatens to place undue strain on the signaling system (SS7) network.

FIG. 1 illustrates a system in which the SS7 network is utilized for providing certain registration and services to a mobile subscriber. In this system a plurality of mobile switching centers (MSC) 10, 20, 30 are all coupled to a signaling transfer point (STP) 40 via the SS7 signaling network which is represented by the dashed lines. Each MSC has one or more base stations (BS), shown as elements 11, 12, 21, 22 and 31. The system also includes a service control point (SCP) and home location register (HLR), here shown as combined element 50. This element keeps track of information related to subscribers that are given wireless service. For example, as shown in the figure, the HLR maintains information about a number of mobile stations here shown as $MS_1$, $MS_2$, and $MS_x$. The HLR keeps profile information in a database regarding various mobile subscribers. As an example, each profile can indicate information about the mobile identification number (MIN), the electronic serial number (ESN), information about where the mobile station is currently registered (that is, with which MSC the mobile station last registered), as well as a list of services for which the mobile subscriber has subscribed. Examples of services which may be available include: call waiting, caller ID, four-digit dialing, and other services which might be available to wireless users provided by various wireless service carriers.

Another element in the system is a Message Center (MC) 60. Such a Message Center, typically employed in wireless systems which provide a service known as Short Messaging Service (SMS) to subscribers, contains text messages which are to be provided to mobile stations. The messages typically are transported from MC 60 to the appropriate MSC via the SS7 network and are subsequently forwarded to the intended recipient mobile station MS.

Another element shown in the system is the Wireless Gateway Manager (WGM) 70 which can couple a plurality of wireless office systems (WOS) 71, 72 and 73 to the STP via, for example, a frame relay network 75. As is shown in the figure, at least one of the wireless office systems may include a voice mail system (VM) 76.

In the system of FIG. 1, presume that $MS_x$ 83 is one of the subscribers to the wireless service and has an affiliation with the voice mail system 76 and desires to receive a message waiting indicator (MWI) from that voice mail system even when away from the wireless office system 73. To accomplish that end in the prior art, the $MS_x$ registers with the MSC 10 via the base station 12 with which it is operating. MSC 10 then becomes the serving MSC (S-MSC) and sends a registration notification to SCP/HLR 50. This registration notification is transported via the SS7 network and through the signal transfer point 40. The SCP/HLR 50 in turn signals the VM 76 via the SS7 network, the STP 40, the WGM 70, the frame relay 75 and its associated WOS 73 so as to advise the VM as to where the $MS_x$ resides. If the VM has a message about which it desires to advise the $MS_x$, then further signaling is transported via the SS7 network to the S-MSC 10 and a message waiting indication is sent out to the mobile station $MS_x$ 83. Alternatively, the HLR could have updated its own MWI information sometime prior to the registration by $MS_x$ and in such circumstance the HLR sends MWI information to the S-MSC. As can be seen, the signaling to provide this one service alone entails a not insignificant usage of the SS7 network. Other services, such as providing short messages from the message center via SS7 to the serving MSC, further burden the signaling network. Another service that consumes signaling network resources relates to voice messaging systems connected to MSCs whereby the SCP/HLR 50 updates its subscriber records concerning such messages and uses the signaling network to do so. Moreover, the very notion of carrying user data, rather than conventional signaling data such as call control, may itself be a burden on the signaling network. It would be beneficial if a technique could be provided for off-loading some of the subscriber services' demand from the SS7.

SUMMARY OF THE INVENTION

The present invention provides a method by which certain functionality that supports services to be offered to wireless subscribers is off-loaded from the signaling system network and is instead provided by an alternative network. The present invention accomplishes this method, in part, by utilizing communication between a service node (e.g., MSC) and a service control point (SCP) (e.g., HLR).

For purposes of the present invention, an alternative network encompasses both connection oriented and connectionless (e.g., packet) networks. In addition a connection-oriented network may include both circuit and packet (e.g., ATM) switching.

In one embodiment of the present invention, the registration process by which a S-MSC notifies the subscriber's HLR includes a transfer of information sufficient to enable subsequent data communication via a packet network (e.g., Internet Protocol (IP) network). For example, the S-MSC may notify the HLR of a packet network address at which it can be contacted to provide a given service to the mobile station in question. Alternatively, the HLR can advise the S-MSC of a packet network address which it can utilize to provide a given service to be made available to the mobile station subscriber.

In this arrangement, data communications necessary to support providing of the services provided to wireless subscribers is carried in a network separate from the signaling network normally utilized for call control and call management.

DETAILED DESCRIPTION

In accordance with the present invention, data transfers to be used to support services for a wireless subscriber can be shifted from the SS7 network to a alternative network, including, but not limited to, connection oriented networks and connectionless networks. For example, at registration time the S-MSC and the subscriber's HLR can exchange sufficient information so as to enable service support information to be transferred to and from the S-MSC via an alternative network such as a packet network (e.g., the Internet). In such a circumstance, the S-MSC can then provide the HLR with one or more packet network addresses that will support various services available to the mobile stations registered with that S-MSC. Alternatively, the HLR can forward packet network address information with regard to those system elements which will support services to be provided to the S-MSC and on to the mobile subscriber registered therewith.

The illustrative embodiments below speak in terms of an IP network, however it should be understood that any alternative network could be used. The illustrative embodiments below also speak in terms of a HLR; however it should be understood that any SCP could be used, including, but not limited to a HLR; an Authentication Center (AC), a VM, a Digit Translation Application (DTA), or a MC. In addition, the illustrative embodiments below speak in terms of a S-MSC; however, it should be understood that any service node could be used.

Figure 1:
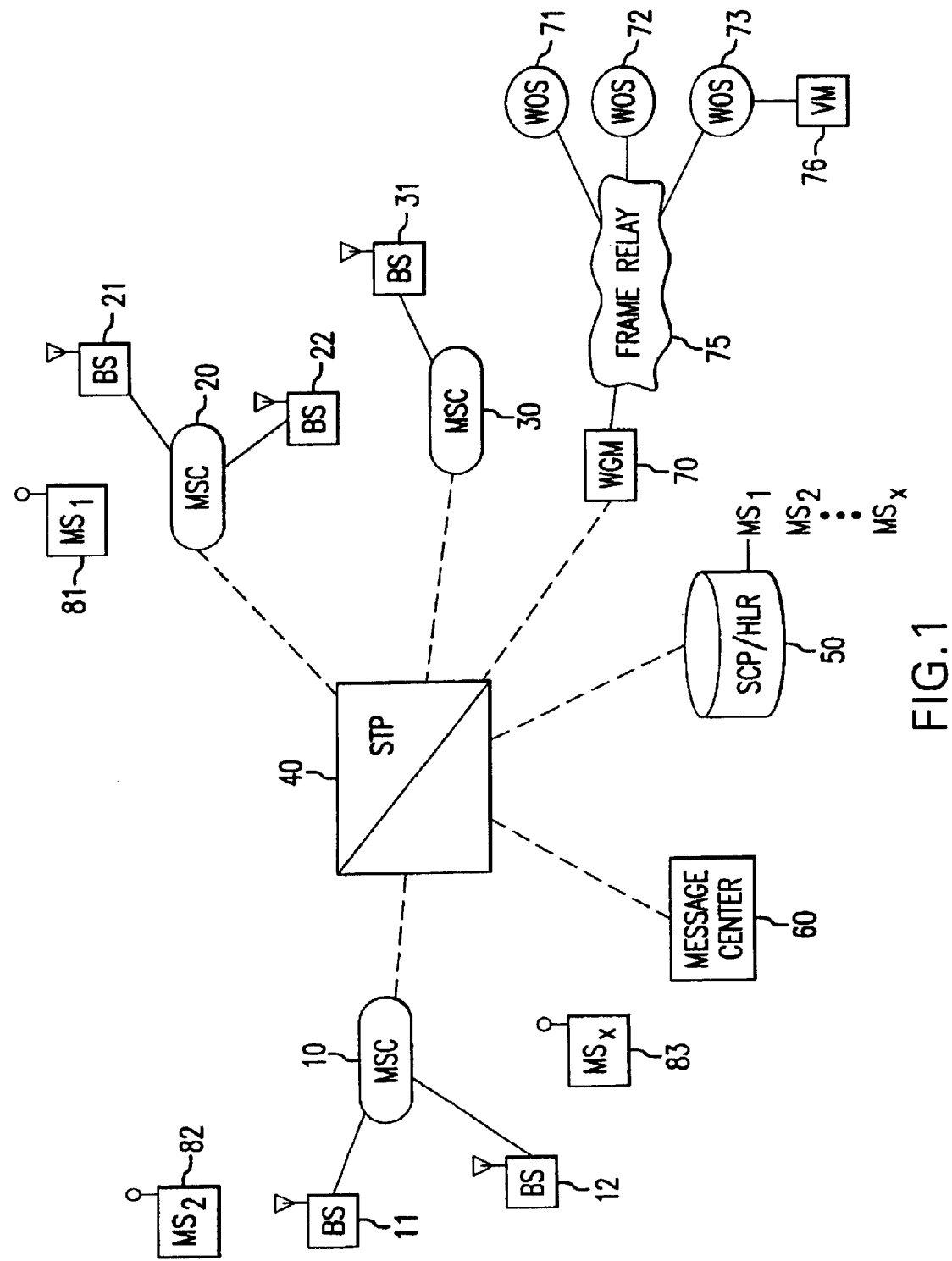
FIG. 1 illustrates a prior art system.
Figure 2:
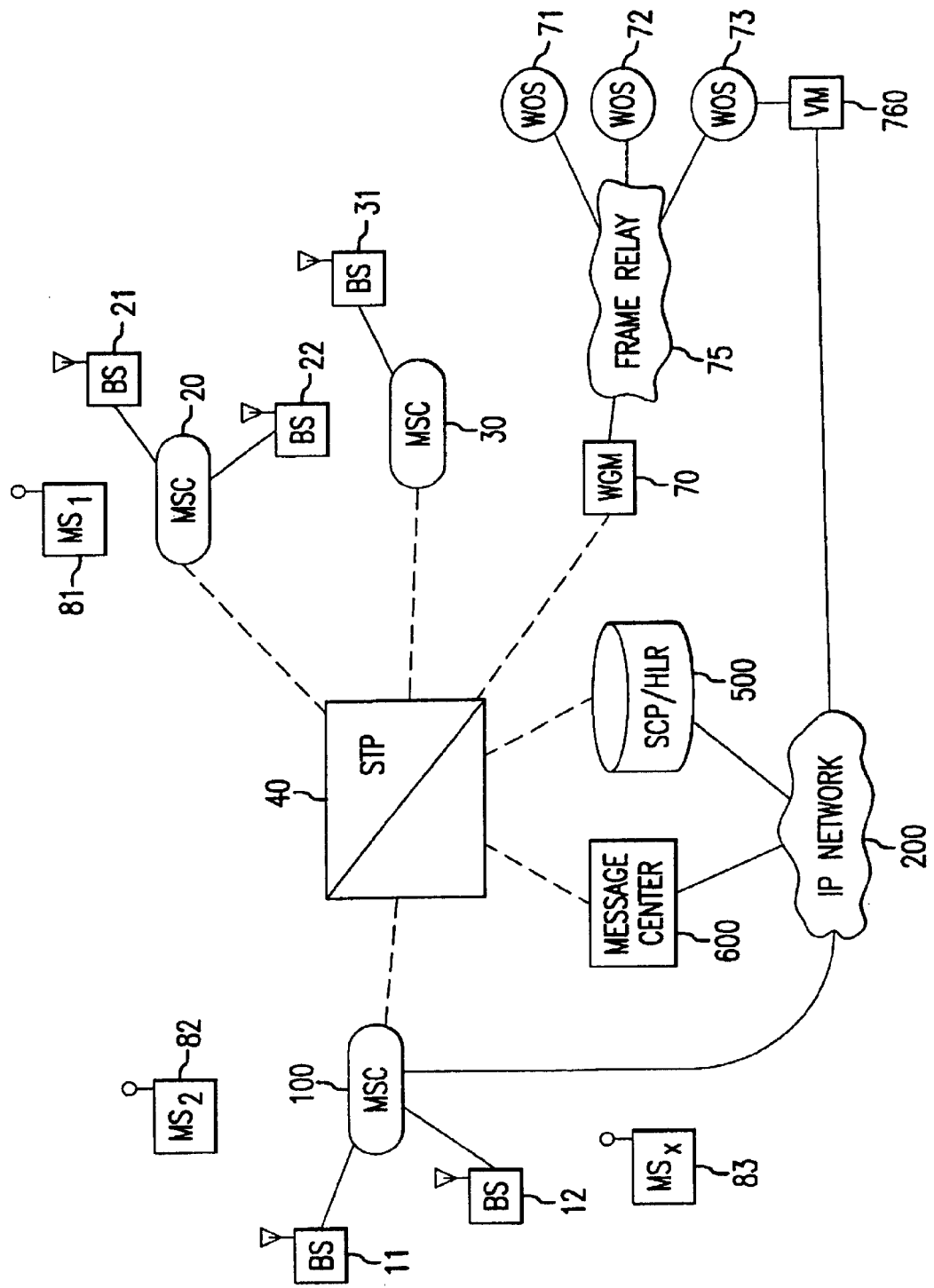
FIG. 2 illustrates a system in accordance with an embodiment of the present invention.

FIG. 2 illustrates, in block diagram form, a system in accordance with an embodiment of the present invention. Elements in FIG. 2 which are the same as those in FIG. 1 are shown with the same reference symbols. The modifications to the various network elements include the capability of communicating via the IP network 200. While only MSC 100 is shown to be connected to the IP network, the other MSCs 20 and 30 could be modified to be so coupled or be capable of coupling to the IP network. Similarly, the WGM 70 may be coupled to the IP network as well, although in the example shown in FIG. 2 it is not. By providing elements such as MSC 100, message center 600, SCP/HLR 500 and VM 760 with the ability to communicate over the IP network 200, it presents an opportunity for shifting certain data communications which would otherwise occur in support of services for a subscriber from the SS7 network to the IP network. For example, rather than, as in the prior art, carrying the message waiting indicator information or the short messages via the SS7 network to the serving MSC 10 for mobile station $MS_x$, that service information could instead be carried via the IP network 200 to an IP address for MSC 100. The packet message would include information identifying the mobile station for which the service is to be rendered, here $MS_x$. The processing capabilities in the MSC would then take the received packet data information and provide the appropriate service to the mobile station. For example, the voice mail system 760 may transfer its message waiting indication via the IP network 200 to MSC 100, which in turn would understand that such an indication should be transmitted to $MS_x$ 83 via typical message waiting indication signaling from base station 12.

Figure 3:
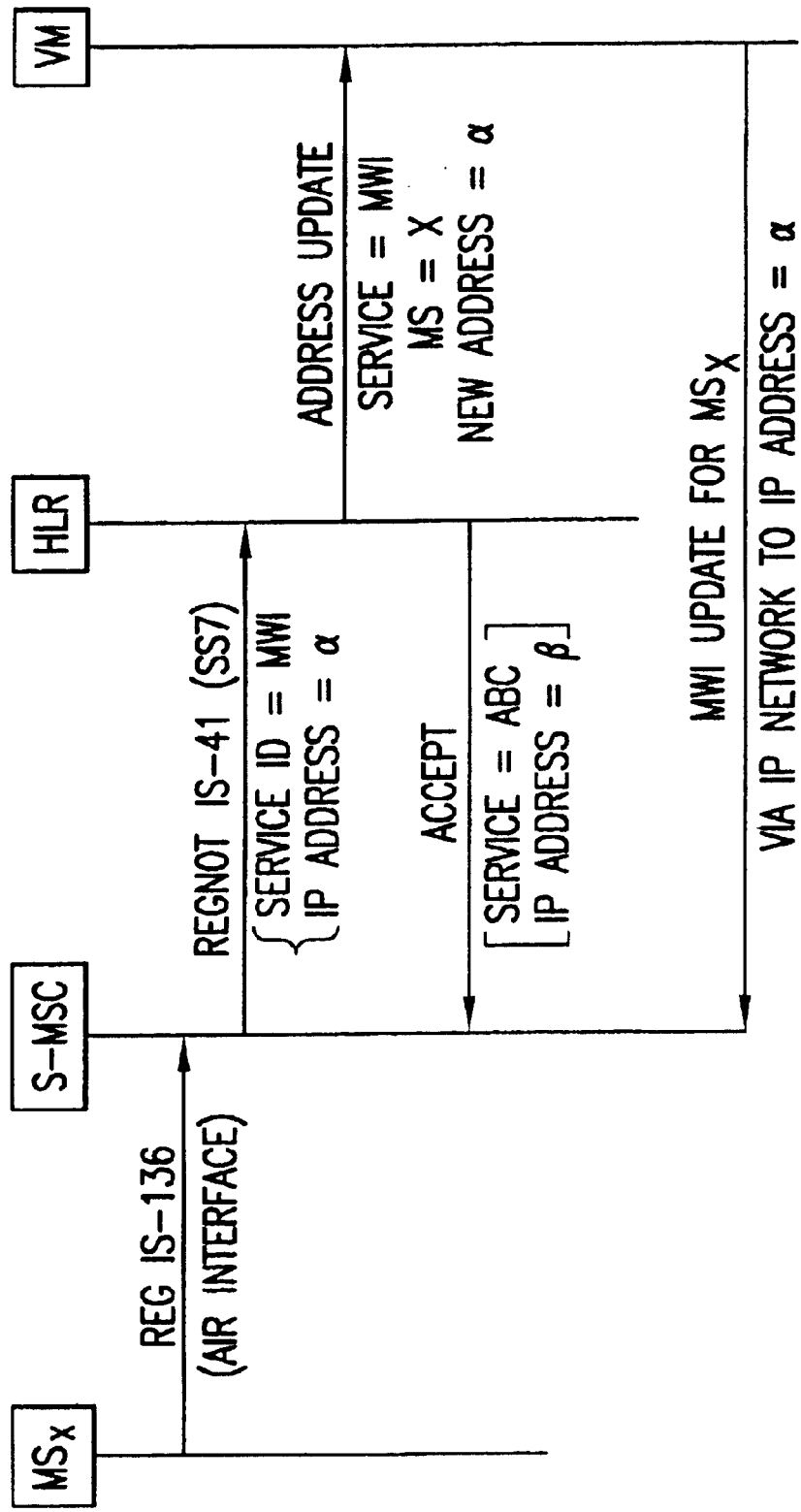
FIG. 3 illustrates a signal flow in connection with an embodiment of the present invention.

FIG. 3 illustrates a process flow which may occur in connection with an embodiment of the present invention. Here, $MS_x$ may register via an over-the-air interface with MSC 100 which becomes S-MSC. This registration may take place via a standard registration signal in the IS-136 protocol. The S-MSC then sends a registration notification signal (REGNOT) via SS7 to the HLR 500. This notification signal is found in the ANSI-41 protocol or in the Global System for Mobile Communications (GSM). If the S-MSC supports the service of Message Waiting Indication (MWI), via for example an IP network, then it can so notify the HLR along with the registration signal and can designate to the HLR a IP network address, herein IP address ∞, at which the serving MSC can receive information to support the providing of this service to any mobile station with which it is in communication. The HLR can then, in turn, send a message via the SS7 network to the voice mail system 760. The information can include an address update with respect to the particular mobile station $MS_x$. The HLR knows to signal this particular voice mail system 760 based on the subscriber profile which it stores regarding $MS_x$. It then can notify the voice mail system that when the voice mail system 760 wishes to send an MWI to $MS_x$, it should send it to the IP address corresponding to the serving MSC. When the voice mail system subsequently has a message waiting indication update for $MS_x$, it can send such an update via the IP network 200 to IP address ∞. Upon receipt of this update, the S-MSC 100 processes the packet data information and generates the message waiting indication information which must be sent over the air via, for example, IS-136 standards to the $MS_x$.

In the embodiment that has just been described, the HLR can signal the voice mail system via the SS7 network. To further reduce the load on the SS7 network, it is possible that the HLR will maintain information in its subscriber profile regarding the IP address of the VM 760. Since this information is not likely to change often, it can be utilized frequently without needing to transfer information to the VM via SS7. Therefore, the method described above could be modified such that the address update is transmitted to the VM at its IP address which has been stored in the HLR.

Also shown in FIG. 3 is an alternative technique for exchanging packet network address information. Rather than the S-MSC assuming the responsibility for defining its own IP address to support a particular service, it is possible that the HLR in either its acceptance of the registration, here shown as the ACCEPT message, or in some other subsequent message exchange with the S-MSC, could transfer information to the MSC identifying a given service (for example service ABC) and an IP address that the S-MSC should utilize to support the service (here IP address β). Thus, the S-MSC can define its IP address, or it can receive an IP address necessary to support a service, or there could be some combination of exchanges. Furthermore, with regard to the transmissions between the HLR and the VM described above, it is conceivable that the very first transmission between the S-MSC and the HLR could include an IP address from the S-MSC which defines a location by which the HLR and S-MSC can communicate to establish all of the remaining information necessary to support the services between the MSC and the HLR. That is, rather than the MSC specifically identifying individual services that it supports via the SS7 network, it could simply send an IP address notifying the HLR where to go to find out the services that the S-MSC supports and to communicate with that S-MSC to exchange data necessary to support a full range of services to be made available to a mobile station $MS_x$.

Furthermore, variations on the S-MSC/HLR exchange are considered as well. For instance, the S-MSC could send a list of services (list X), the list including service identifiers and an IP address for each service which may or may not be unique to a given service. The services need not be limited to data services, but can relate to voice services as well. Alternatively the HLR could send a list of services (list Y), including service identifiers and an IP address for each service which may or may not be unique to a given service. The services identified in the lists may or may not overlap. Also the lists may be dynamic, that is, subject to change. In another variation the S-MSC and HLR can exchange list X and list Y.

After the REGNOT/ACCEPT exchange, the use of the service/address pairs can vary, as follows. Referring to the first exchange, where the S-MSC sends list X, the HLR might store the Service List for its own sole use. That is, as information intended for an MS reaches the HLR (by conventional or IP associated mechanisms), the HLR would use the alternate means afforded by the service/address pair to convey information to the S-MSC and, therefore, to the MS. Alternatively, the HLR might forward some of the service/address pairs to the node(s) associated with the indicated service. In these cases when the node receiving the new address information has new data for an MS, it would communicate with S-MSC directly and not via the HLR.

Referring to the second exchange, where the HLR sends list Y, the HLR is providing S-MSC with current service/address pairs for static or quasi-static node addresses stored at the HLR. The transfer of these service/address pairs to the S-MSC would typically be based on the HLR having prior knowledge of the S-MSC's transport capabilities. Note that the information in "Service List Y" is conveyed as part of the REGNOT/ACCEPT exchange but service/address pairs exchanged in this direction need not be limited to a registration sequence. For example, events external to the S-MSC and the HLR might occur that would cause a service node to convey to the HLR a new service/address pair for a MS. The HLR would convey this to the S-MSC—independent of registration sequences—so that the S-MSC has the correct current address for the associated service.

While the invention has been described with regard to a voice mail service, it is equally applicable to other services available to the mobile station subscriber. For example, the SMS information can be transferred from the message center to the serving MSC via the IP network as is suggested by the connections shown in FIG. 2. Alternatively, other services which rely upon data transmission to and from the serving MSC could rely on an IP network as a transport mechanism once IP addresses have been exchanged. This means that, as services increase and the number of subscribers increase, the additional load of data exchanges is passed off to the IP network rather than taking the already heavily utilized signaling network. Furthermore, while the present invention has been described with reference to utilizing, for example, the Internet, to carry this additional information to and from the serving MSC, it should be recognized that other data networks might be employed as well; it is just that the Internet at this time has provided an opportunity for relatively ubiquitous communication services.

While the present invention is described with respect to specific embodiments, these embodiments are not intended to limit the scope of the invention, which is defined by the appended claims.

What is claimed is:

1. A method comprising:
   receiving a registration request for a subscriber to a wireless service at a service node;
   determining, at the service node, an address communicable with by an alternative network and associated with the wireless service, the address supporting the wireless service for a plurality of subscriber devices; and
   transferring information in support of the wireless service between the subscriber and an information source or recipient using the determined address;
   wherein said step of determining includes sending a registration notification to a Service Control Point (SCP) and receiving, from the SCP, an IP address associated with the wireless service; and
   wherein an alternative network corresponding to said address is selected from the group consisting of a connection-oriented network and a connectionless network, wherein the connectionless network comprises the Internet.

2. A method comprising:
   receiving a registration request for a subscriber to a wireless service at a service node;
   determining, at the service node, an address communicable with by an alternative network and associated with the wireless service, the address supporting the wireless service for a plurality of subscriber devices; and
   transferring information in support of the wireless service between the subscriber and an information source or recipient using the determined address;
   wherein said step of determining includes sending a registration notification comprising a service identifier and an Internet Protocol (IP) address update to a SCP and forwarding the IP address update to the wireless service; and
   wherein an alternative network corresponding to said address is selected from the group consisting of a connection-oriented network and a connectionless network, wherein the connectionless network comprises the Internet.

3. The method of claim 2, wherein the step of forwarding uses a network selected from the group consisting of a connection oriented network, a connectionless network, and combinations thereof.

4. The method of claim 2, wherein the registration notification further comprises an IP address for the serving node.

5. The method of claim 1, wherein the SCP is selected from the group consisting of Home Location Register (HLR), Authentication Center (AC), Voice mail (VM), Digit Translation Application (DTA), and Message Center (MC).

6. A method of using an alternative network to provide wireless services comprising:
   determining a list of wireless services to be offered to a subscriber;
   identifying a corresponding list of addresses communicable with by an alternative network for each service;

communicating the wireless services list and the corresponding addresses list between a service node and a Service Control Point (SCP).

7. The method of claim 6, wherein the step of communicating comprises:

sending the wireless services list and addresses list from the service node to the SCP.

8. The method of claim 6, wherein the step of communicating comprises:

sending the wireless services list and addresses list from the SCP to the service node.

9. The method of claim 6, wherein the list of wireless services and the corresponding list of addresses each comprise two lists, wherein the first wireless services list and its corresponding addresses list are stored in the service node and the second wireless services list and its corresponding addresses list are stored in the SCP; and the step of communicating comprises exchanging the two sets of lists between the service node and the SCP.

10. The method of claim 7, further comprising the step of forwarding a single wireless service and an address communicable with by the alternative network from the SCP to a node associated with the wireless service.

11. A method for providing services to a mobile station subscriber, the method comprising the steps of:

storing a subscriber service profile;

receiving a registration notice;

storing first information identifying a service node with which the subscriber has registered; and exchanging second information with the identified service node via a first network to enable a future information exchange with the identified service node via a second alternative network.

12. The method of claim 11 wherein said step of exchanging second information comprises the sub-step of receiving an address communicable with by an alternative network address from the identified service node related to a wireless service.

13. The method of claim 11 wherein said step of exchanging second information comprises the sub-step of transmitting communicable with by an alternative network address to the identified service node related to a wireless service.

14. The method according to claim 11, wherein the first network is selected from the group consisting of connection oriented networks, connectionless networks, and combinations thereof.

15. The method of claim 11, wherein the second network is selected from the group consisting of connection oriented networks, connectionless networks, and combinations thereof.

16. The method of claim 1, wherein the service node comprises a serving mobile switching center (S-MSC).

17. The method of claim 6, wherein the service node comprises a serving mobile switching center (S-MSC).

18. The method of claim 11, wherein the service node comprises a serving mobile switching center (S-MSC).

* * * * *